US010715619B2

(12) United States Patent
Bernard

(10) Patent No.: US 10,715,619 B2
(45) Date of Patent: Jul. 14, 2020

(54) CACHE MANAGEMENT USING A PROBABILISTIC DATA STRUCTURE

(71) Applicant: RED HAT, INC., Raleigh, NC (US)

(72) Inventor: Emmanuel Bernard, Puteaux (FR)

(73) Assignee: Red Hat, Inc., Raleigh, NC (US)

( * ) Notice: Subject to any disclaimer, the term of this patent is extended or adjusted under 35 U.S.C. 154(b) by 166 days.

(21) Appl. No.: 15/784,246

(22) Filed: Oct. 16, 2017

(65) Prior Publication Data

US 2019/0116238 A1    Apr. 18, 2019

(51) Int. Cl.
*H04L 29/08* (2006.01)
*H04L 29/06* (2006.01)
*H04L 12/24* (2006.01)

(52) U.S. Cl.
CPC ........ *H04L 67/2842* (2013.01); *H04L 41/142* (2013.01); *H04L 67/42* (2013.01)

(58) Field of Classification Search
CPC ... H04L 67/2842; H04L 41/142; H04L 67/42; H04L 67/2852
See application file for complete search history.

(56) References Cited

U.S. PATENT DOCUMENTS

| | | | | | |
|---|---|---|---|---|---|
| 4,908,861 | A | * | 3/1990 | Brachtl | H04L 9/002 340/5.8 |
| 5,701,464 | A | * | 12/1997 | Aucsmith | G06F 21/34 |
| 6,128,701 | A | * | 10/2000 | Malcolm | G06F 16/9574 711/133 |
| 8,769,073 | B2 | | 7/2014 | Humphreys et al. | |
| 9,305,056 | B1 | | 4/2016 | Gupta et al. | |
| 9,355,109 | B2 | | 5/2016 | Archak et al. | |
| 9,436,596 | B2 | | 9/2016 | Sengupta et al. | |
| 10,262,160 | B2 | * | 4/2019 | Rubin | G06F 16/22 |
| 10,263,784 | B2 | * | 4/2019 | Rubin | G06F 16/2365 |

(Continued)

OTHER PUBLICATIONS

Jing, J. et al., "Bit-Sequences: An Adaptive Cache Invalidation Method in Mobile Client/Server Environments," GTE Laboratories, Inc. 40 Sylvan Road Waltham, MA 02254; Department of Computer Sciences Purdue University West Lafayette, IN 47907 USA; 3500 West Balcones Center Dr. Austin, Texas 78759-6509; David Sarno Research Center CN 5300 Princeton, NJ 08543, http://webcache.googleusercontent.com/search?q=cache:GXoDksMPW6wJ:citeseerx.ist.psu.edu/viewdoc/download%3Fdoi%3D10.1.1.47.5615%26rep%3Drep1%26type%3Dps+&cd=2&hl=en&ct=clnk&gl=au.

(Continued)

*Primary Examiner* — Uzma Alam
(74) *Attorney, Agent, or Firm* — Kilpatrick Townsend & Stockton LLP

(57) ABSTRACT

A cache memory can be managed using a probabilistic data structure. For example, a server can store a probabilistic data structure in a memory device. The probabilistic data structure can indicate a probability that a client device has a key-value pair stored in a cache memory. The server can determine an updated version of the key-value pair. The server can then determine that there is a positive probability that the client device has the key-value pair stored in the cache memory using the probabilistic data structure. Based on determining the updated version of the key-value pair and that there is the positive probability that the client device has the key-value pair stored in the cache memory, the server can transmit an invalidation communication to the client device.

29 Claims, 8 Drawing Sheets

(56) References Cited

U.S. PATENT DOCUMENTS

| | | | | |
|---|---|---|---|---|
| 2010/0169274 A1* | 7/2010 | Kulkarni | | G06F 16/22 |
| | | | | 707/609 |
| 2010/0332471 A1* | 12/2010 | Cypher | | G06F 16/2255 |
| | | | | 707/736 |
| 2011/0145188 A1* | 6/2011 | Vachuska | | G06F 16/2272 |
| | | | | 707/610 |
| 2011/0276744 A1* | 11/2011 | Sengupta | | G06F 12/0866 |
| | | | | 711/103 |
| 2014/0019387 A1* | 1/2014 | Cao | | H04L 67/1097 |
| | | | | 706/12 |
| 2014/0136792 A1* | 5/2014 | Frachtenberg | | G06F 12/121 |
| | | | | 711/135 |
| 2016/0162508 A1* | 6/2016 | Brosch | | G06F 16/1748 |
| | | | | 707/692 |
| 2017/0068727 A1 | 3/2017 | Rubin et al. | | |
| 2017/0070349 A1* | 3/2017 | Rubin | | G06F 16/2365 |
| 2018/0034626 A1* | 2/2018 | Yamada | | G06F 16/242 |
| 2018/0039535 A1* | 2/2018 | Sharifi Tehrani | | G06F 11/0727 |
| 2019/0005239 A1* | 1/2019 | Park | | G06F 21/563 |

OTHER PUBLICATIONS

Chang, Y. et al., "Dynamic Cache Invalidation Scheme in IR-based Wireless Environments," National Cheng Kung University, Tainan, Taiwan, 2008, http://pdfs.semanticscholar.org/e14d/912df26697a80b4f6bfde9f9bdc344d1657c.pdf.

Le, E. et al., "Implementing a Web Cache using Consistent Hashing," 2014, http://www.scs.stanford.edu/14au-cs244b/labs/projects/le_stephenson_manandhar.pdf.

Chirkova, et al., "Cache Invalidation and Propagation in Distributed Caching," http://www4.ncsu.edu/~rychirko/Papers/techReport021505.pdf.

* cited by examiner

US 10,715,619 B2

CACHE MANAGEMENT USING A PROBABILISTIC DATA STRUCTURE

TECHNICAL FIELD

The present disclosure relates generally to storage access and control. More specifically, but not by way of limitation, this disclosure relates to cache management using a probabilistic data structure.

BACKGROUND

A client device can transmit a request for data to a server, which can retrieve the data and transmit the data back to the client device. For example, the client device can request a key-value pair from the server. A key-value pair can include a key with a corresponding value. The server can access a database to retrieve the key-value pair and transmit the key-value pair back to the client device. After receiving the data from the server, the client device may store the data locally in a cache memory. This can be referred to as near caching. Near caching can enable the client device to quickly and easily obtain the data again in the future, without having to communicate with the server.

DETAILED DESCRIPTION

There can be disadvantages to implementing near caching on a client device. For example, a client device can receive a data item (e.g., a key-value pair) from a server and store the data item in a local cache memory to implement near caching. But if the data item is subsequently modified by the server, the version of the data item stored in the client device's cache memory will be outdated. And the client device may use the outdated data item to perform tasks, which can result in a variety of problems. In some cases, the server may try to prevent this issue by maintaining a log of all of the data items transmitted to all of the client devices. Then, when an update is made to a particular data item, the server can transmit invalidation communications to all of the client devices associated with the particular data item in the log. The invalidation communications can cause the client devices to remove the data item from their cache memories, preventing the client devices from using outdated versions of the data item. But such a log can become impractically large in size when there are thousands or millions or data items, and hundreds or thousands of client devices, to keep track of.

Some examples of the present disclosure overcome one or more of the abovementioned issues by enabling a server to use a probabilistic data structure, rather than a log, to indicate which data items are stored on a client device. The probabilistic data structure can indicate a probability (e.g., likelihood) that a given data item is stored on the client device. When an update is made to a data item, the server can access the probabilistic data structure to determine if there is a non-zero probability (e.g., a high probability) that the client device has the data item and, if so, transmit an invalidation communication to the client device. Because a probabilistic data structure takes up significantly less memory than the abovementioned log, some examples of the present disclosure can overcome the memory inefficiencies of the log-based approach while still preventing the client devices from using outdated versions of data items.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
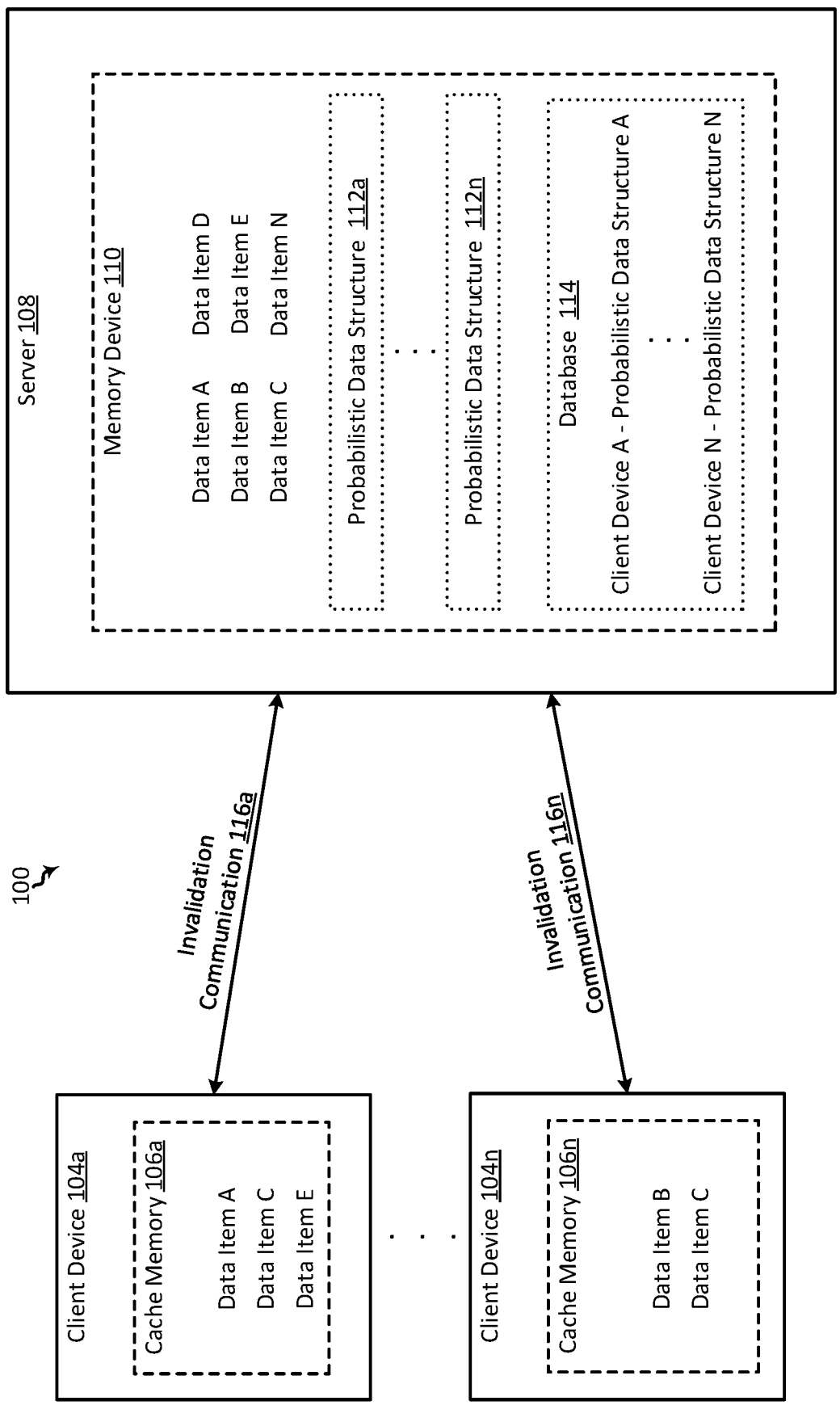
FIG. 1 is a block diagram of an example of a system for cache management using a probabilistic data structure according to some aspects.

FIG. 1 is a block diagram of an example of a system 100 for cache management using a probabilistic data structure according to some aspects. The system 100 can include client devices 104a-n in communication with a server 108 via a network, such as the Internet, a local network, or a cloud-computing network. The client devices 104a-n can have cache memories 106a-n for storing data items, such as Data Items A, B, C, and E. The client devices 104a-n can request data items from the server 108, which can retrieve the data items (e.g., from memory device 110 or a remote database) and transmit the data items back to the client devices 104a-n. The client devices 104a-n can then store the data items in the respective cache memories 106a-n.

The server 108 can include one or more probabilistic data structures 112a-n. A probabilistic data structure can indicate a probability of a value being within a set of values, such as the probability of a key-value pair being within a set of key-value pairs stored in a cache memory of a client device. Some probabilistic data structures can be relatively binary, for example, by either indicating (i) that a value has zero probability of being within a set of values, or (ii) that the value has a non-zero (e.g., positive) probability of being within the set of values. Examples of a probabilistic data structure can include a bloom filter, a quotient filter, an approximate membership query, a hash wheel or hash table, a cuckoo filter, or any combination of these. In some examples, each probabilistic data structure can correspond to a respective client device. For example, probabilistic data structure 112a can be related to client device 104a, probabilistic data structure 112n can be related to client device 104n, and so on. The server 108 can maintain a database 114 that indicates the relationships between the probabilistic data structures 112a-n and the client devices 104a-n.

When the server 108 transmits a data item to a client device, the server 108 can access the database 114 to determine which of the probabilistic data structures 112a-n corresponds to the client device. The server 108 can then update the probabilistic data structure that corresponds to the client device to reflect that the data item is potentially (e.g., likely) in the cache memory of the client device. As a particular example, if the server transmits Data Item A to the client device 104a, the server 108 can access the database 114, determine that probabilistic data structure 112a corresponds to the client device 104a, and then update the probabilistic data structure 112a to reflect that the client device 104a potentially has Data Item A stored in cache memory 106a.

If an update is made to a data item, the server 108 can access some or all of the probabilistic data structures 112a-n to determine which of the client devices 104a-n potentially have the prior version of the data item. The server 108 can then transmit invalidation communications to those client devices. An invalidation communication can be an electronic communication that causes a client device to remove (e.g., delete) one or more data items from a cache memory or update one or more data items in the cache memory. In one particular example, if an update is made to Data Item A, the server 108 can access the probabilistic data structures 112a-n to determine that client device 104a potentially has a prior (e.g., now outdated) version of Data Item A. The server 108 can then send an invalidation communication 116a to the client device 104a. The invalidation communication 116a can cause the client device 104a to remove Data Item A from its cache memory 106a. As another example, if an update is made to Data Item C, the server 108 can access the probabilistic data structures 112a-n to determine that client device 104a and client device 104n both potentially have a prior version of Data Item C. The server 108 can then send an invalidation communication 116a to client device 104a and an invalidation communication 116n to client device 104n. This can cause the client devices 104a, 104n to remove Data Item C from the respective cache memories 106a, 106n.

An example of the above process is described in greater detail below with reference to FIG. 2. Although the steps in FIG. 2 are shown in a particular order, other examples can include more steps, fewer steps, or a different order of the steps shown in FIG. 2.

Figure 2:
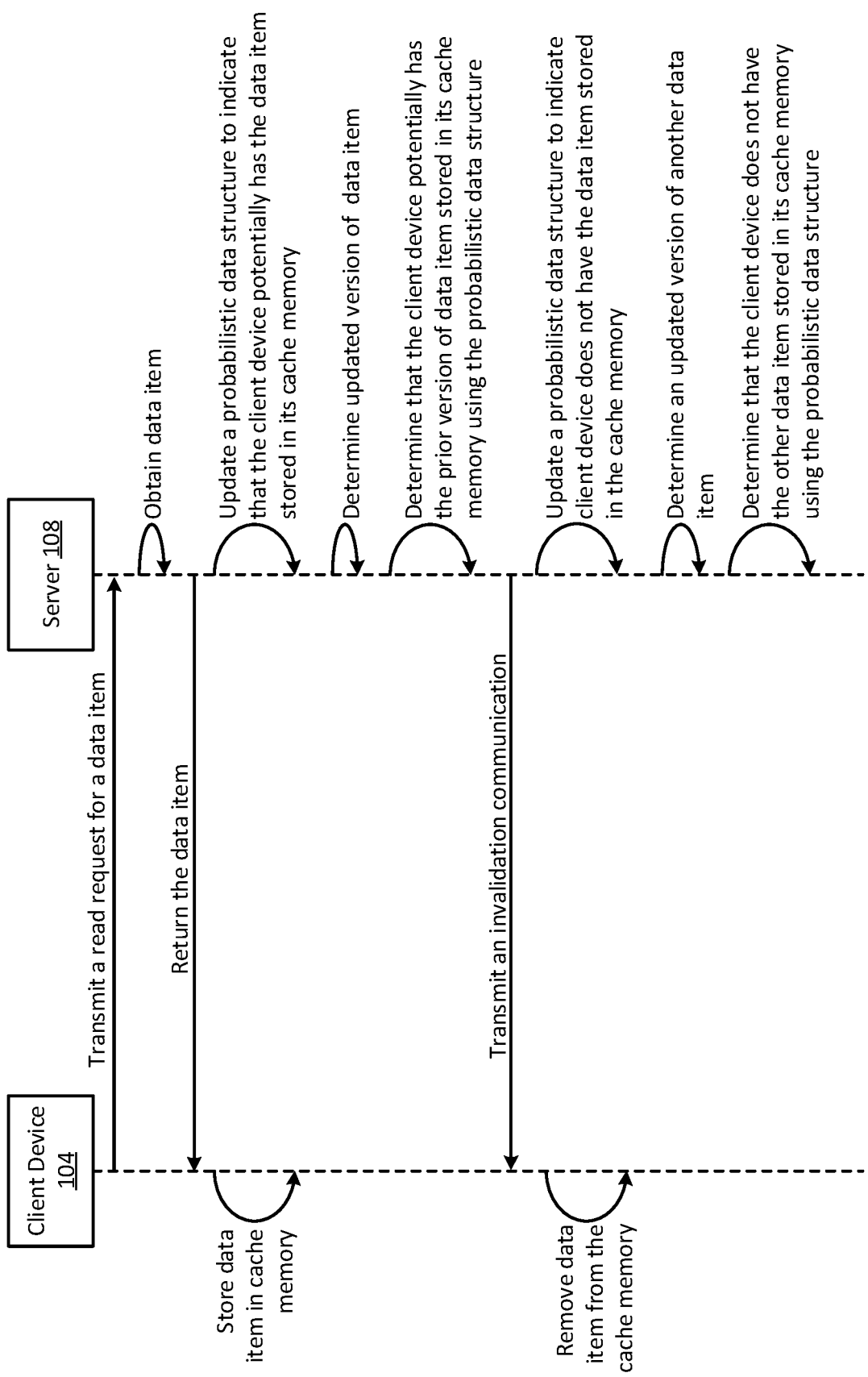
FIG. 2 is a sequence diagram of an example of a process for cache management using a probabilistic data structure according to some aspects.

FIG. 2 begins with a client device 104 transmitting a read request for a data item to the server 108. An example of the data item can be Data Item A shown in FIG. 1. The server 108 can obtain the data item and return the data item to the client device 104. The client device 104 can then store the data item in a cache memory. The server 108 can also update a probabilistic data structure to indicate that the client device 104 potentially has the data item stored in the cache memory.

Thereafter, the server 108 can determine an updated version of the data item. For example, the server 108 can receive the updated version of the data item from a remote computing device. Alternatively, the server 108 can perform one or more mathematical operations or other processes to determine the updated version of the data item. After the server 108 has determined the updated version of the data item, the server 108 can determine which client devices potentially have a prior version of the data item stored in their cache memories. For example, the server 108 can access all of the probabilistic data structures relating to all of the client devices to determine that client device 104 potentially has the prior version of the data item stored in its cache memory. Based on determining that client device 104 potentially has the prior version of the data item stored in its cache memory, the server 108 can transmit an invalidation communication to the client device 104. The client device 104 can receive the invalidation communication and responsively remove the data item from its cache memory.

In some examples, after transmitting the invalidation communication to the client device 104, the server 108 updates a probabilistic data structure that corresponds to the client device 104. The server 108 can update the probabilistic data structure to indicate that the client device 104 does not have the data item stored in its cache memory. If another update is then made to the data item, the server 108 can access the probabilistic data structure and determine that the client device does not have the data item. Based on determining that the client device does not have the data item, the server 108 can refrain from sending another invalidation communication for the data item to the client device 104. In this manner, the server 108 can prevent unnecessary invalidation communications from being sent to client devices. This can reduce network traffic and improve network performance.

In some examples, the server 108 can also determine an updated version of another data item, such as Data Item D shown in FIG. 1. The server 108 can determine that the client device 104 does not have the other data item stored in its cache memory by accessing the probabilistic data structure. Based on determining that the client device 104 does not have the other data item stored in its cache memory, the server 108 may refrain from transmitting an invalidation communication for the other data item to the client device 104. This can also prevent unnecessary invalidation communications from being sent to client devices, thereby reducing network traffic and improving network performance.

Figure 3:
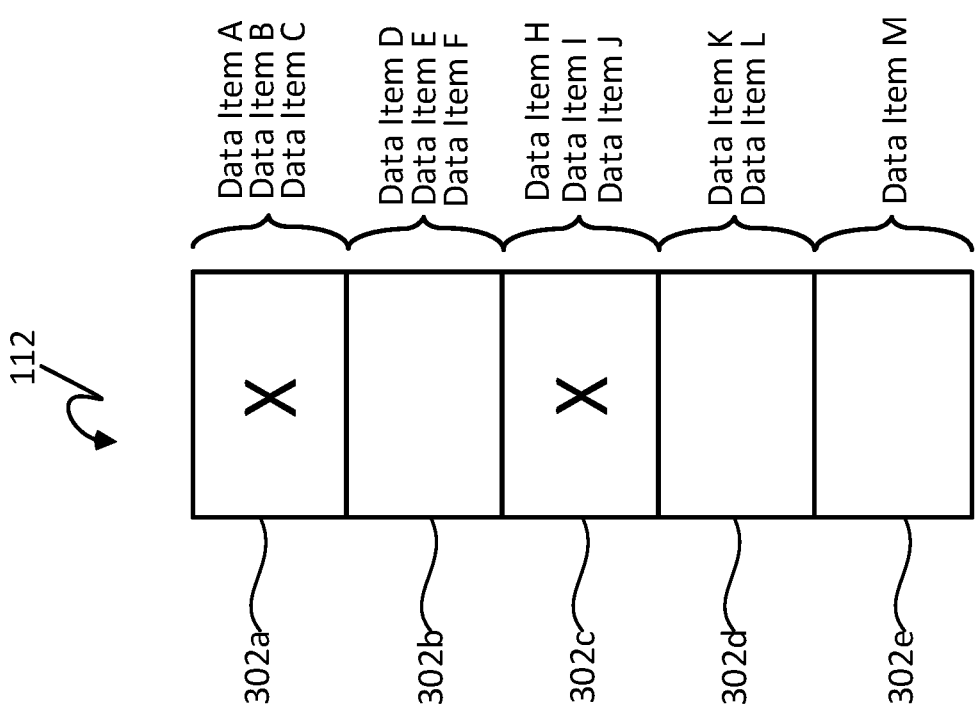
FIG. 3 is a block diagram of an example of a probabilistic data structure according to some aspects.

Any suitable probabilistic data structure (or combination of probabilistic data structures) can be used to implement some aspects of the present disclosure. One example of a probabilistic data structure 112 is shown in FIG. 3. The probabilistic data structure 112 includes multiple bins 302a-e. Each bin can be designated for one or more data items, such as one or more key-value pairs. In this example, bin 302a is designated for Data Item A, Data Item B, and Data Item C. Bin 302b is designated for Data Item D, Data Item E, and Data Item F. And so on.

Any number and combination of techniques can be used to designate data items to a bin. In one particular example, the data items can be key-value pairs. An example of a key-value pair can be "17-Desk," where "17" is the key and "Desk" is the value. And each of the bins can be designated for a range of keys. For example, bin 302a can be designate for keys 1-10. Bin 302b can be designated for keys 11-20. And so on. The server 108 can assign each of the key-value pairs to the bin that covers the corresponding range of keys. As another particular example, each of the bins can be designated for a range of hashed keys. The server 108 can determine a hashed key for each of the key-value pairs, and then assign the key-value pair to the bin that covers the corresponding range of hashed keys.

The probabilistic data structure 112 can be associated with a particular client device 104. The server 108 can update the probabilistic data structure 112 to indicate that particular data items have been transmitted to the client device 104. For example, if the server 108 has transmitted Data Item A, Data Item B, Data Item C, or any combination of these to the client device 104, the server 108 can update that probabilistic data structure 112 to indicate that the client device 104 potentially has some or all of these data items. This is represented in FIG. 3 by an "X" in bin 302a. Similarly, if the server 108 has transmitted Data Item H, Data Item I, Data Item J, or any combination of these to the client device 104, the server 108 can update that probabilistic data structure 112 to indicate that the client device 104 potentially has some or all of these data items, as represented by an "X" in bin 302c. In this manner, the probabilistic data structure 112 can indicate whether the client device 104 potentially has a certain data item, such as Data Item A, or definitely does not have a certain data item, such as Data Item D. By grouping data items together in bins 302a-e, rather than having separate log entries for each individual data item, the probabilistic data structure 112 can take up less memory than a log while still providing an acceptable level of accuracy.

If a data item is updated, the server 108 can access the probabilistic data structure 112 to determine if the client device 104 potentially has the data item or definitely does not have the data item. For example, if Data Item A is updated, the server 108 can access the probabilistic data structure 112 to determine that the client device 104 may have the data item, based on the "X" in bin 302a. Because the data items are grouped by bins 302a-e, the probabilistic data structure 112 may provide false positives (e.g., false indications that a client device 104 has a certain data item, when the client device does not have that data item), but cannot provide false negatives (e.g., false indications that the client device 104 does not have a certain data item, when the client device 104 does in fact have that data item). The server 108 may then transmit an invalidation communication to the client device 104. The invalidation communication can cause the client device 104 to remove some or all of the data items associated with bin 302a. The server 108 can also update the probabilistic data structure 112 to indicate that the client device 104 no longer has any of the data items in bin 302a. This can be represented in FIG. 2 by removing the "X" from bin 302a.

The server 108 may alternatively use other types of probabilistic data structures than the example shown in FIG. 3. For example, the server 108 can use a hash wheel as the probabilistic data structure 112. A hash wheel can be a theoretical construct in which a circle (or "wheel") is divided into multiple segments, where each segment is analogous to a bin in FIG. 3 and covers a range of values (e.g., hashed keys in key-value pairs). The server 108 can use the hash wheel similarly to the bins 302a-e discussed above. As another example, the server 108 can use a bloom filter as the probabilistic data structure 112. The bloom filter can have a predefined number of bits, such as 100 bits. The server 108 can cause the bloom filter to represent one or more data items by adjusting its bits, thereby indicating that the client device 104 potentially has the one or more data items. The server 108 can then access the bloom filter to determine if the client device 104 has a data item that has been updated, and transmit one or more invalidation communications if needed. The server 108 can use any number and combination of probabilistic data structures for any number and combination of client devices.

Figure 4:
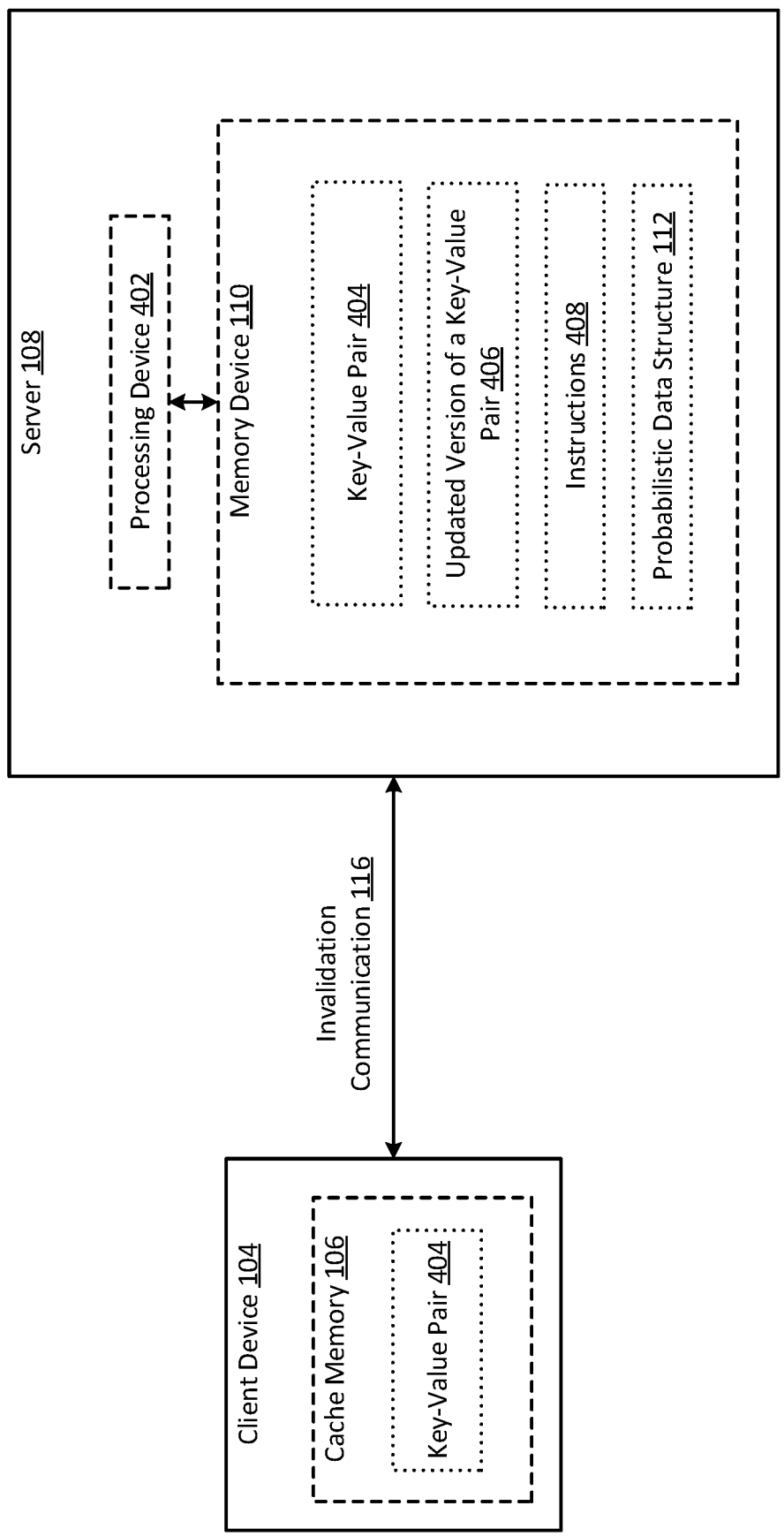
FIG. 4 is a block diagram of another example of a system for cache management using a probabilistic data structure according to some aspects.

FIG. 4 is a block diagram of another example of a system for cache management using a probabilistic data structure according to some aspects. The system includes a client device 104 with a cache memory 106 in which a key-value pair 404 is stored. Examples of the client device 104 can include a laptop computer, desktop computer, server, mobile device (e.g., smartphone), tablet, e-reader, or any combination of these.

The system also includes a server 108 having a processing device 402 communicatively coupled to a memory device 110. The processing device 402 can include one processing device or multiple processing devices. Non-limiting examples of the processing device 402 include a Field-Programmable Gate Array (FPGA), an application-specific integrated circuit (ASIC), a microprocessor, etc. The processing device 402 can execute one or more operations for implementing cache management using a probabilistic data structure 112. The processing device 402 can execute instructions 408 stored in the memory device 110 to perform the operations. In some examples, the instructions 408 can include processor-specific instructions generated by a compiler or an interpreter from code written in any suitable computer-programming language, such as C, C++, C#, Java, etc.

Memory device 110 can include one memory device or multiple memory devices. The memory device 110 can be non-volatile and may include any type of memory device that retains stored information when powered off. Non-limiting examples of the memory device 110 include electrically erasable and programmable read-only memory (EEPROM), flash memory, cache memory, or any other type of non-volatile memory. In some examples, at least some of the memory devices 110 can include a medium from which the processing device 402 can read instructions 408. A computer-readable medium can include electronic, optical, magnetic, or other storage devices capable of providing the processing device with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read instructions.

The memory device 110 can include the key-value pair 404, an updated version of the key-value pair 406, or both of these. The key-value pair 404 can be a prior version of the key-value pair, and the second version of the key-value pair 406 can be an updated version of the key-value pair. In some examples, the key-value pair 404 can be referred to as a first version of a key-value pair, and the updated version of the key-value pair 406 can be referred to as a second version of the key-value pair. The server 108 can receive, generate, or determine the updated version of the key-value pair 406.

The memory device 110 can also include a probabilistic data structure 112. The probabilistic data structure 112 can be related to, or associated with, the client device 104. The server 108 may use the probabilistic data structure 112 to determine whether the client device 104 potentially has the key-value pair 404 in the cache memory 106. If so, the server 108 can transmit an invalidation communication 116 to the client device 104. This can cause the client device 104 to remove the key-value pair 404 from the cache memory 106.

Figure 5:
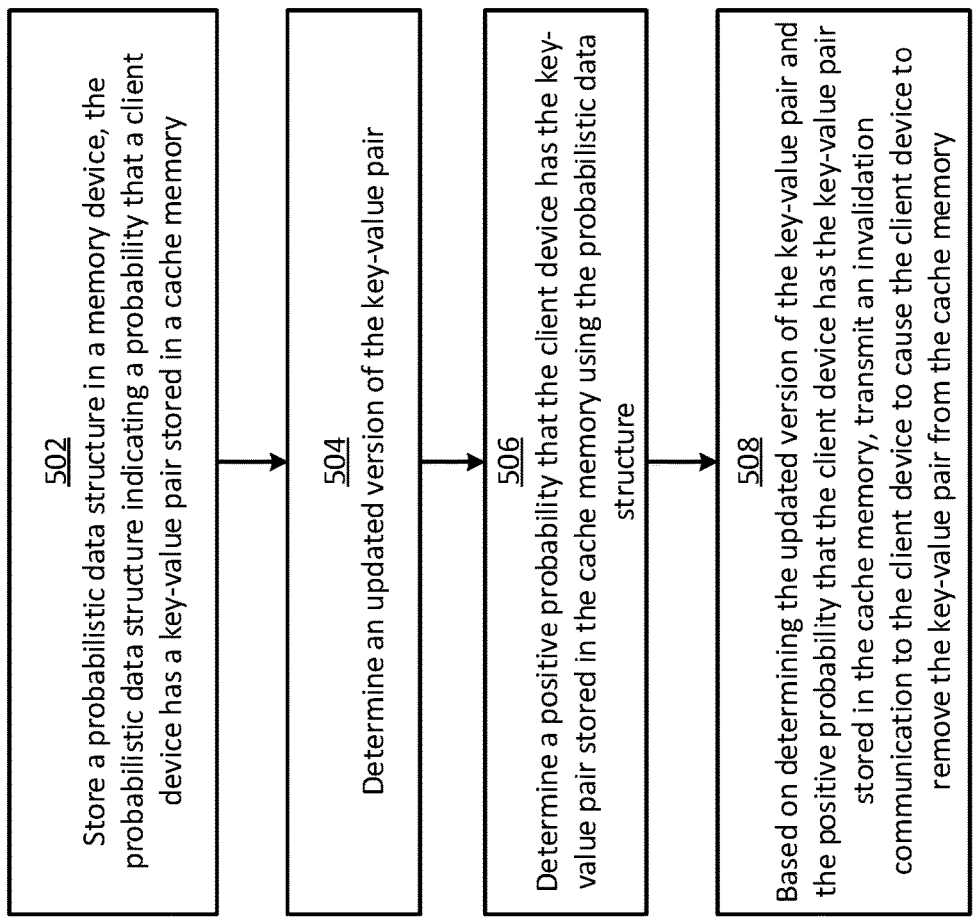
FIG. 5 is a flow chart of an example of a process for cache management using a probabilistic data structure according to some aspects.

In some examples, the server 108 can implement some or all of the process shown in FIG. 5. In other examples, the server 108 can implement more steps, fewer steps, or a different combination of the steps shown in FIG. 5. The steps of FIG. 5 are described below with reference to the components of FIG. 4 above.

In block 502, the processing device 402 stores a probabilistic data structure 112 in a memory device 110. The probabilistic data structure 112 can indicate a probability that a client device 104 has a key-value pair 404 (e.g., a first version of a key-value pair) stored in a cache memory 106.

In block 504, the processing device 402 determines an updated version of the key-value pair 406 (e.g., a second version of the key-value pair). The updated version of the key-value pair 406 can be different from the key-value pair 404. For example, the updated version of the key-value pair 406 can have the same key as, but a different value from, the key-value pair 404. In some examples, the processing device 402 can determine the updated version of the key-value pair 406 using one or more algorithms or rules. In other examples, the processing device 402 can determine the updated version of the key-value pair 406 by communicating with a remote database or a remote computing device (e.g., another server).

In block 506, the processing device 402 determines a positive probability that the client device 104 has the key-value pair 404 stored in the cache memory 106 using the probabilistic data structure 112. For example, the processing device 402 can access the probabilistic data structure 112 to determine that there is a 10%, 50%, or 51% (likely) chance that the client device 104 has the key-value pair 404 stored in the cache memory 106. In some examples, the probabilistic data structure 112 can indicate that there is a positive probability of the client device 104 having the key-value pair 404 based on the key or value (i) being associated with a certain bin of the probabilistic data structure 112, (ii) being indicated by a certain pattern of bits in the probabilistic data structure 112, (iii) being referenced in the probabilistic data structure 112, (iv) or any combination of these.

In block 508, the processing device 402 transmits an invalidation communication 116 to the client device 104 to cause the client device 104 to remove the key-value pair 404 from the cache memory 106. The processing device 402 can transmit the invalidation communication 116 based on determining the updated version of the key-value pair and the positive probability that the client device 104 has the key-value pair stored in its cache memory 106.

Some probabilistic data structures 112 are add-only data structures in which data items can be added but not removed. Adding a data item to a probabilistic data structure may include configuring the probabilistic data structure to indicate that there is a positive probability of the data item being stored on the client device 104. Removing a data item from a probabilistic data structure can include configuring the probabilistic data structure to indicate that there is not a positive probability (e.g., that there is zero probability) of the data item being stored on the client device 104. One example of an add-only data structure is a bloom filter.

While very memory efficient, add-only data structures can present a variety of issues. For example, the server 108 can transmit a data item to the client device 104, and then update a bloom filter to indicate that the client device potentially has the data item. But the bloom filter cannot be subsequently updated to remove the reference to the data item. If the data item is subsequently updated, and the server 108 transmits an invalidation communication for the data item to the client device 104, the server 108 cannot then update the bloom filter to indicate that the client device 104 does not have the data item. So, the bloom filter may no longer accurately indicate the data items stored in the cache memory 106 of the client device 104. And as more data items are updated, the bloom filter will become less and less accurate. This inaccuracy may lead to unnecessary invalidation communications being sent to client devices, which can increase network latency and reduce network performance. Some examples of the present disclosure can overcome this issue by synchronizing a probabilistic data structure generated by a client device 104 with a probabilistic data structure 112 maintained by the server 108. An example of a system for implementing such synchronization is shown in FIG. 6.

Figure 6:
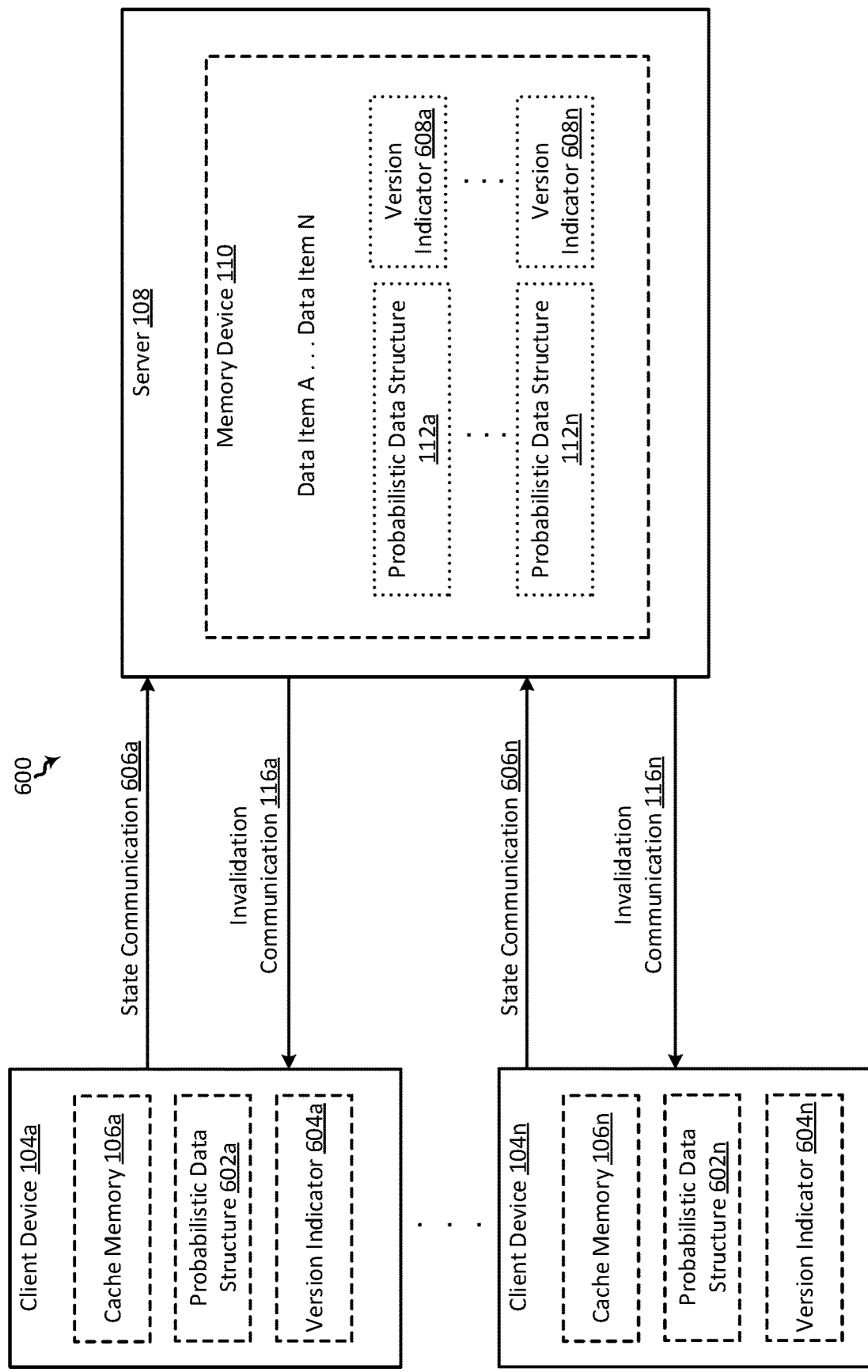
FIG. 6 is a block diagram of another example of a system for cache management using a probabilistic data structure according to some aspects.

Referring now to FIG. 6, the system 600 includes client devices 104a-n in communication with a server 108 via a network. The client devices 104a-n can include cache memories 104a-n. The server 108 can include a memory device 110 with Data Items A-N and probabilistic data structures 112a-n. The server 108 may additionally or alternatively include the database 114 of FIG. 1, or any other feature or combination of features discussed above.

The client devices 104a-n can also include probabilistic data structures 602a-n, such as bloom filters. The client devices 104a-n can generate the probabilistic data structures 602a-n in response to an event. Examples of an event can include the passage of a preset time interval, such as ten minutes; receiving a communication from the server 108; execution of an application; a number of received communications exceeding a threshold, such as a number of received invalidation-communications or other notifications exceeding a threshold; or any combination of these. The probabilistic data structures 602a-n can indicate the data items stored in the cache memories 106a-n of the client devices 104a-n. For example, client device 104a can periodically generate a bloom filter indicating which data items are stored in cache memory 106a. And client device 104b can periodically generate a bloom filter indicating which data items are stored in cache memory 106b. Because the client devices 104a-n have access to the cache memories 106a-n and therefore "know" what data items are stored in the cache memories 106a-n, the probabilistic data structures 602a-n will typically be more accurate than the probabilistic data structures 112a-n maintained by the server 108.

After generating the probabilistic data structures 602a-n, the client devices 104a-n can transmit state communications 606a-n to the server 108. A state communication can indicate a state of a cache memory of a client device (e.g., by indicating a state of a probabilistic data structure, which in turn indicates the state of the cache memory). For example, the state communication 606a can indicate which data items are stored in the cache memory 106a of the client device 104a at a particular instance in time. In some examples, a state communication can include a representation of a probabilistic data structure, such as probabilistic data structure 602a. Because a probabilistic data structure can be smaller in size (e.g., use fewer bits) than an entire log of all of the data items stored in a cache memory, a state communication can also be smaller in size than a communication that has the entire log of all the data items. For example, the probabilistic data structure 602a can be a bloom filter that is 100 bits in size. And the client device 104a can transmit a state communication 606a that includes the bloom filter. In such an example, the total packet size for the state communication 606a can be around 120 bits total, with 100 bits being dedicated to the bloom filter and another 20 bits being dedicated to a packet header of the state communication 606a. In contrast, a log of all of the data items in the cache memory 106a may be 500 bits in size by itself. So, a communication carrying such a log may be 520 bits, which is roughly 4.5 times larger.

In some examples, the server 108 can receive the state communications 606a-n. The server 108 can then update the probabilistic data structures 112a-n to match the probabilistic data structures 602a-n generated by the client devices 104a-n. Updating the probabilistic data structures 112a-n can include modifying the existing probabilistic data structures 112a-n, replacing the probabilistic data structures 112a-n with new probabilistic data structures, or both. As a particular example in which the probabilistic data structures 602a, 112a are bloom filters, the server 108 can update the probabilistic data structure 112a to have the same configuration of bits as the probabilistic data structure 602a. Updating the probabilistic data structures 112a-n to match the probabilistic data structures 602a-n can be referred to as synchronization. In some examples, synchronization can enable various types of probabilistic data structures, such as add-only data structures, to be used where they may otherwise be impractical. To effectuate this synchronization, in some examples the probabilistic data structures 602a-n on the client devices 104a-n will be of the same type as the corresponding probabilistic data structures 112a-n on the server 108. For example, the probabilistic data structures 602a, 112a can both be bloom filters. And the probabilistic data structures 602n, 112n can both be cuckoo filters. And so on.

Figure 7:
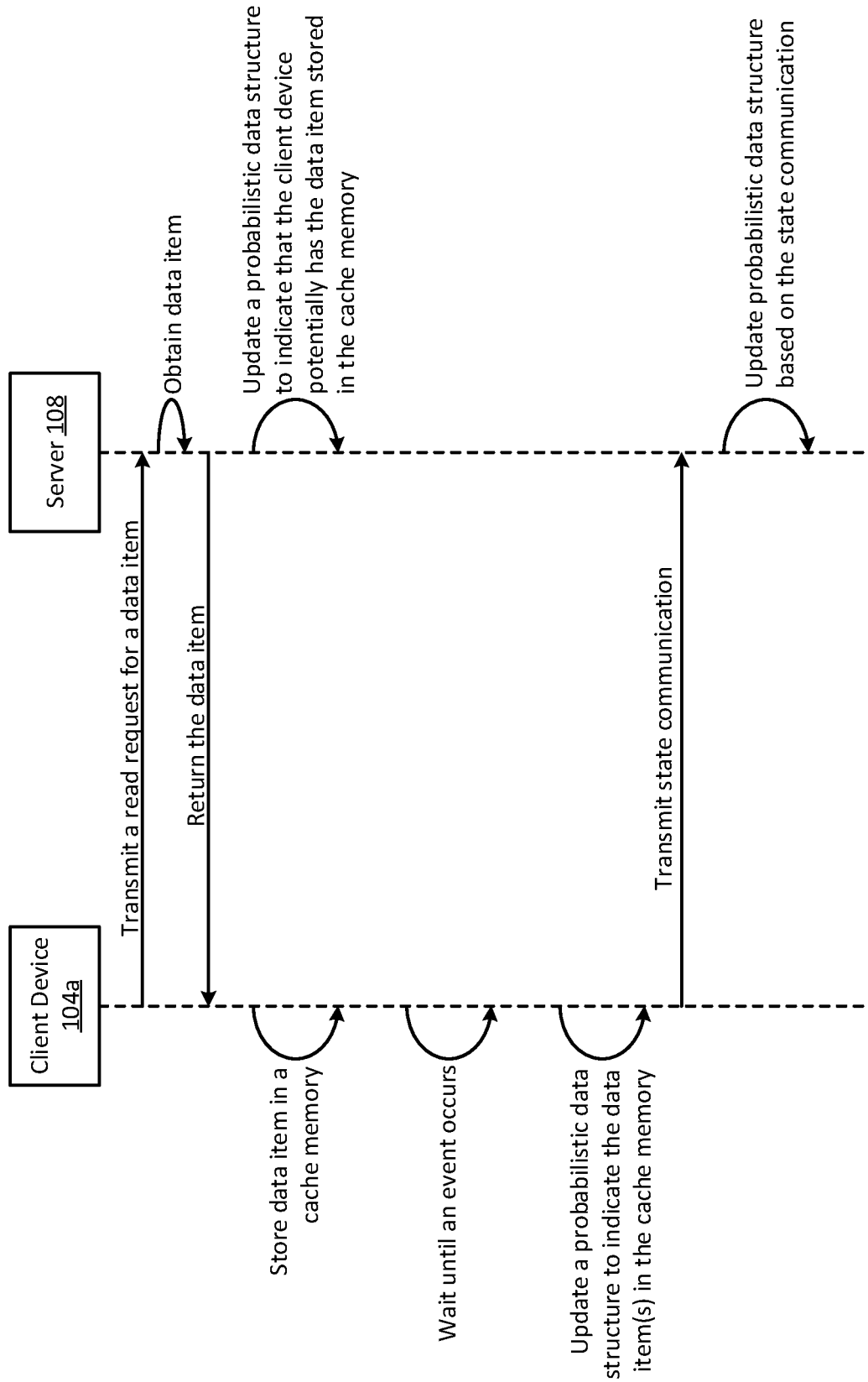
FIG. 7 is a sequence diagram of another example of a process for cache management using a probabilistic data structure according to some aspects.

One example of the above process is described in greater detail below with reference to FIG. 7. Although the steps in FIG. 7 are shown in a particular order, other examples can include more steps, fewer steps, or a different order of the steps shown in FIG. 7. The steps described below are with reference to the components shown in FIG. 6.

FIG. 7 begins with a client device 104 transmitting a read request for a data item to a server 108. An example of the data item can be Data Item A shown in FIG. 1. The server 108 can obtain the data item and return the data item to the client device 104a. The client device 104a can then store the data item in a cache memory 106a. The server 108 can also update a probabilistic data structure 112a to indicate that the client device 104a potentially has the data item stored in the cache memory 106a.

After storing the data item in cache memory 106a, in some examples the client device 104a can then wait until an event occurs. Based on the event occurring, the client device 104a can also generate (e.g., update) a probabilistic data structure 602a of its own. The probabilistic data structure 602a can indicate the data item(s) stored in the cache memory 106a. The client device 104a can then transmit a state communication 606a to the server 108. The state communication 606a can include a representation of the probabilistic data structure 602. In other examples, the client device 104 can wait until a first event occurs to generate the probabilistic data structure 602a and wait until a second event occurs to transmit the state communication 606a.

The server 108 can receive the state communication 606a and responsively update its probabilistic data structure 112a based on the state communication 606a (e.g., based on information provided in the state communication 606a). For example, the server 108 can update the probabilistic data structure 112a to match the probabilistic data structure 602a on the client device 104a.

Referring back to FIG. 6, in some examples the system 100 can use additional or alternative techniques to reduce the size of the state communications 606a-n, which may reduce network latency and improve system performance. For example, the client device 104a can generate a first version of the probabilistic data structure 602a at one point in time. Thereafter, the client device 104a can generate a second (e.g., updated) version of the probabilistic data structure 602a at a later point in time. For example, after the client device 104a generates the first version of the probabilistic data structure 602a, the client device 104a may receive additional data items from the server 108, update the cache memory 106a to include the additional data items, and generate the second version of the probabilistic data structure 602a to reflect the updated cache memory 106a. The client device 104 can then determine a difference between the first version of the probabilistic data structure 602a and the second version of the probabilistic data structure 602a. The client device 104 can transmit a state communication 606a that has a representation of the difference between the first and second versions, rather than the entirety of the second version of the probabilistic data structure 602a.

Examples of the representation of the difference can include the difference itself or a compressed version of the difference. Because the representation of the difference may be smaller in size than the entirety of the second version of the probabilistic data structure 602a, this process can reduce the size of the state communications 606a-n transmitted to the server 108. In some examples, the server 108 can receive the state communication 606a and update the probabilistic data structure 112a based on the representation of the difference. For example, the server 108 can update the probabilistic data structure 112a to match the second version of the probabilistic data structure 602a based on the representation of the difference in the state communication 606a.

In some examples, the system 600 can operate asynchronously such that the client device 104a transmits read requests and state communications to the server 108 in an uncoordinated manner. This can cause a variety of problems. For example, the client device 104a may transmit a read request for a data item and a state communication 606a to the server 108. The client device 104a may transmit the read request before or after transmitting the state communication 606a. Either way, in some cases, the server 108 may perform operations in response to the read request before performing operations in response to the state communication 606a. For example, in response to the read request, the server 108 may obtain the data item, transmit the data item back to the client device 104a, and update a corresponding probabilistic data structure 112a to reflect that the client device 104a potentially has the data item. Then, in response to the state communication 606a, the server 108 may update the probabilistic data structure 112a based on the information in the state communication 606a. This will cause the probabilistic data structure 112a to have incorrect or outdated information, as the probabilistic data structure 112a will no longer reflect that the data item was transmitted to the client device 104.

Some examples of the present disclosure can overcome one or more of the above issues using version indicators 604a-n. A version indicator can indicate a version of a probabilistic data structure. Examples of a version indicator can be a number, a letter, a hashed value, or any combination of these. The client devices 104a-n can maintain respective version indicators 604a-n for their respective probabilistic data structures 602a-n. The server 108 may also maintain one or more version indicators 608a-n for the one or more of the probabilistic data structures 112a-n. The system 600 can use the version indicators 602a-n, 604a-n as discussed below.

In an example in which the system 600 is asynchronous, the client device 104a may have a version indicator 604a that indicates that the probabilistic data structure 602a is a particular version (e.g., version 1), and the server 108 may also have a version indicator 608a that indicates that the probabilistic data structure 112a is also the particular version. The client device 104a may then transmit (at the same time or separately) both a read request and a state communication 606a to the server 108. The state communication 606a can include the version indicator 604a for the probabilistic data structure 602a. The server 108 can receive the read request and the state communication 606a and first perform operations associated with the read request. For example, the server 108 may obtain the data item and update a value of the version indicator 608a. Updating a version indicator can include incrementing a previous value of the version indicator or hashing the previous value of the version indicator using a hashing algorithm. For example, the server 108 can increment the version indicator 608a from version 1 to version 2. The server 108 can then transmit the data item and the updated value for the version indicator 608*a* back to the client device 104*a*, which may store the data item in the cache memory 106*a* and update its version indicator 604*a* to reflect the updated value. Thereafter, the server 108 may process the state communication 606*a*. The server 108 can determine that the version indicator in the state communication 606*a* does not match the version indicator 608*a* (e.g., now version 2) stored in the memory device 110. In some examples, if the version indicator in the state communication 606*a* has a lower value than the version indicator 608*a* stored in the memory device 110, the server 108 may not update the probabilistic data structure 112*a* based on the state communication 606*a*. This can help prevent the server 108 from overwriting a more current version of the probabilistic data structure 112*a*. Alternatively, if the version indicator in the state communication 606*a* has the same value as the version indicator 608*a* stored in the memory device 110, the server 108 can update the probabilistic data structure 112*a* based on the state communication 606*a*.

Figure 8:
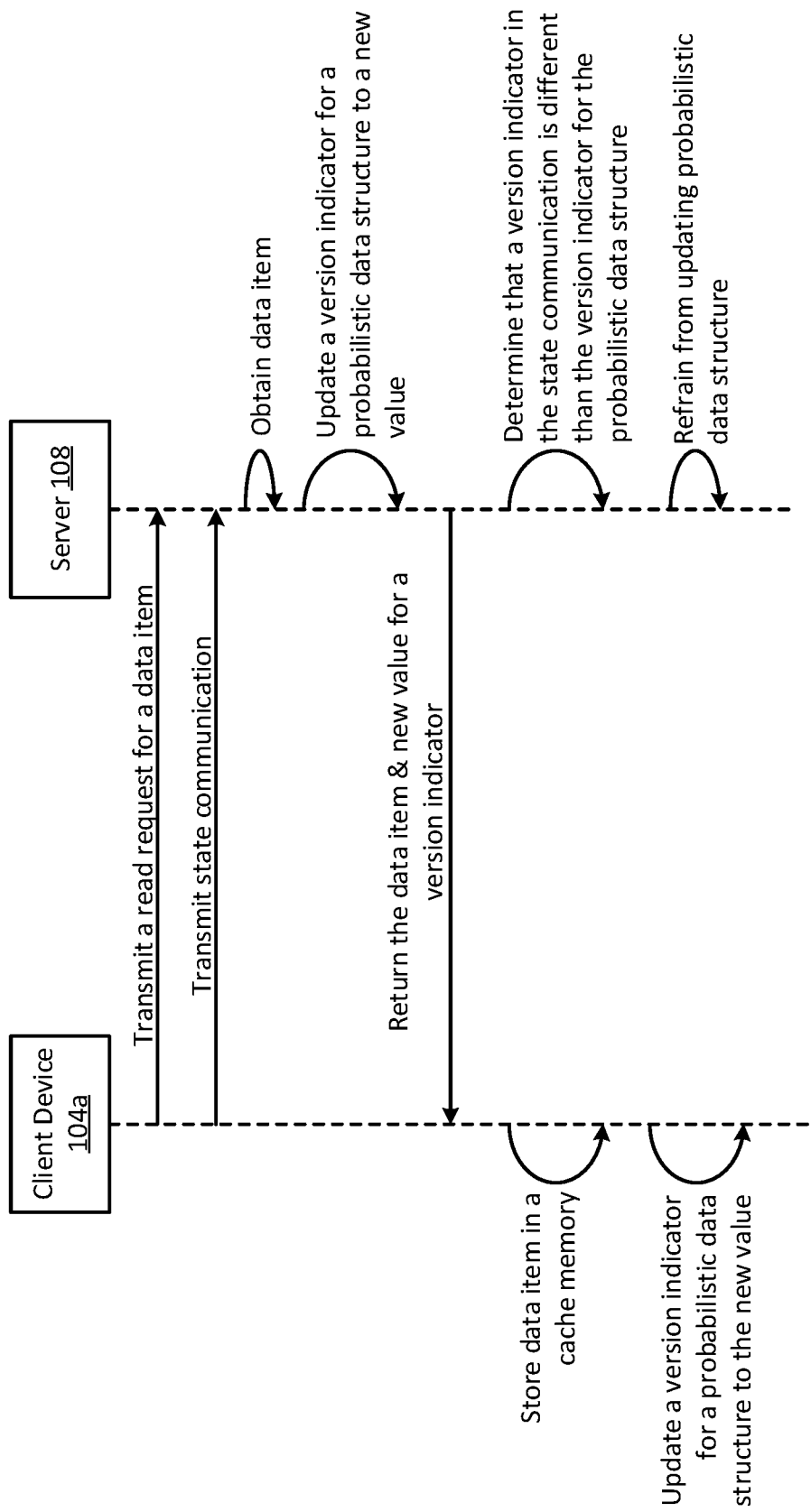
FIG. 8 is a sequence diagram of yet another example of a process for cache management using a probabilistic data structure according to some aspects.

One example of the above process is described in greater detail below with reference to FIG. 8. Although the steps in FIG. 8 are shown in a particular order, other examples can include more steps, fewer steps, or a different order of the steps shown in FIG. 8. The steps described below are with reference to the components shown in FIG. 6.

FIG. 8 begins with a client device 104 transmitting a read request for a data item to a server 108. The client device 104 also transmits a state communication 606*a* to the server 108. The state communication 606*a* can include a version indicator 604*a* for a probabilistic data structure 602*a* stored on the client device 104*a*. After receiving the state communication 606*a*, the server 108 can obtain the data item. The server 108 can also update a version indicator 608*a* for a probabilistic data structure 112*a* to a new value. The server 108 can then return the data item and the new value for the version indicator 608*a* back to the client device 104*a*, which can store the data item in a cache memory 106*a* and update its version indicator 604*a* for its probabilistic data structure 602*a* to the new value.

Thereafter, the server 108 can then determine that the version indicator in the state communication 606*a* is different from (e.g., lower than) the version indicator 608*a* for the probabilistic data structure 112*a*. Based on determining that the version indicator in the state communication 606*a* is different from the version indicator 608*a* for the probabilistic data structure 112*a*, the server 108 can refrain from updating the probabilistic data structure 112*a*.

Referring back to FIG. 6, in an alternative example, the client device 104*a* can transmit a state communication 606*a* that has the version indicator 604*a*. The server 108 can determine that the version indicator 604*a* in the state communication 606*a* is the same as the version indicator 608*a* maintained by the server 108. Based on the version indicator 604*a* being the same as the version indicator 608*a* maintained by the server 108, the server 108 can update the probabilistic data structure 112*a* using the information in the state communication 606*a*.

In some examples, the server 108 can synchronize its version indicator 608*a* with the version indicator 604*a* maintained by the client device 104*a*. This synchronization can occur in response to an event (e.g., the passage of time or a read request sent from the client device 104*a*). For example, the server 108 can generate an initial value for the version indicator 608*a*. Examples of the initial value can be a randomly generated value or zero. The server 108 can transmit the initial value for the version indicator 608*a* to the client device 104*a*, for example, in response to receiving a first read request from the client device 104*a*. The client device 104*a* can receive the initial value and cause its version indicator 604*a* to also have the initial value.

Although the components of FIGS. 1, 4, and 6 are depicted in certain configurations for illustrative purposes, other examples can include more components, fewer components, or other arrangements of the components shown in these figures. For example, the memory device 110 may be external to the server 108, and the server 108 may communicate with the memory device 110 via a network (e.g., to access or maintain the probabilistic data structures 112*a-n*). As another example, the memory device 110 can include multiple memory devices that are included in, or remote from, the server 108. Some examples can include multiple servers acting alone or in concert with one another to implement one or more features of the present disclosure.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) described herein can be combined with any other example(s).

The invention claimed is:

1. A method comprising:
    storing, by a server, a probabilistic data structure in a memory device, the probabilistic data structure indicating a probability that a cache memory of a client device has a first version of a key-value pair, the client device being remote from the server;
    determining, by the server, a second version of the key-value pair that is different from the first version of the key-value pair;
    determining, by the server, a positive probability that the client device has the first version of the key-value pair stored in the cache memory using the probabilistic data structure;
    based on determining the second version of the key-value pair and the positive probability that the client device has the first version of the key-value pair stored in the cache memory, transmitting, by the server, an invalidation communication over a network to the client device to cause the client device to remove the first version of the key-value pair from the cache memory; and
    subsequent to transmitting the invalidation communication:
        transmitting, by the server, the second version of the key-value pair to the client device for causing the client device to store the second version of the key-value pair in the cache memory of the client device; and
        updating, by the server, the probabilistic data structure to indicate that there is the positive probability of the client device having the second version of the key-value pair.

2. The method of claim 1, wherein:
    the probabilistic data structure includes a plurality of bins, each bin in the plurality of bins being designated for at least one respective key-value pair; and
    determining that there is the positive probability that the client device has the first version of the key-value pair comprises:

determining that the client device corresponds to the probabilistic data structure;
determining that a key of the first version of the key-value pair corresponds to a particular bin of the plurality of bins, wherein the particular bin is designated as having one or more key-value pairs that are stored on the client device; and
determining that there is the positive probability that the client device has the first version of the key-value pair based on determining that the client device corresponds to the probabilistic data structure and that the key corresponds to the particular bin.

3. The method of claim 2, wherein the invalidation communication is configured to cause the client device to remove, from the cache memory, all of the key-value pairs corresponding to the particular bin.

4. The method of claim 1, wherein the probabilistic data structure is a bloom filter having a predefined number of bits, and further comprising configuring the bloom filter to correspond to a plurality of key-value pairs that includes the first version of the key-value pair.

5. The method of claim 1, further comprising:
storing, by the server, a plurality of probabilistic data structures in the memory device, wherein each probabilistic data structure in the plurality of probabilistic data structures is designated for a respective client device among a plurality of client devices and indicates a respective probability of the respective client device having one or more key-value pairs; and
determining, by the server, that the client device corresponds to the probabilistic data structure from among the plurality of probabilistic data structures by accessing a database that relates the plurality of client devices to the plurality of probabilistic data structures.

6. The method of claim 1, further comprising, prior to determining the second version of the key-value pair:
receiving, by the server, a read request from the client device for reading the key-value pair;
transmitting, by the server, the first version of the key-value pair to the client device in response to the read request; and
updating, by the server, the probabilistic data structure to indicate that there is the positive probability of the client device having the first version of the key-value pair.

7. The method of claim 1, further comprising:
after transmitting the invalidation communication, updating, by the server, the probabilistic data structure to indicate that the client device does not have the first version of the key-value pair stored in the cache memory.

8. The method of claim 1, wherein the probabilistic data structure is a first probabilistic data structure, and further comprising:
receiving, by the server and from the client device, an electronic communication indicating a state of a second probabilistic data structure stored on the client device, the second probabilistic data structure indicating the probability that the client device has one or more key-value pairs stored in the cache memory; and
based on receiving the electronic communication, updating, by the server, the first probabilistic data structure to match the state of the second probabilistic data structure.

9. The method of claim 8, wherein the electronic communication further indicates a version of the second probabilistic data structure, and further comprising updating the first probabilistic data structure based on determining that the version of the second probabilistic data structure matches a version of the first probabilistic data structure.

10. The method of claim 1, wherein the network includes the Internet.

11. The method of claim 1, wherein the client device lacks the second version of the key-value pair prior to receiving the invalidation communication.

12. A server comprising:
a processing device; and
a memory device on which instructions are stored that are executable by the processing device for causing the processing device to:
store a probabilistic data structure indicating a probability that a cache memory of a client device has a first version of a key-value pair, the client device being remote from the server;
determine a second version of the key-value pair that is different from the first version of the key-value pair;
determine a positive probability that the client device has the first version of the key-value pair stored in the cache memory using the probabilistic data structure;
based on determining the second version of the key-value pair and the positive probability that the client device has the first version of the key-value pair stored in the cache memory, transmit an invalidation communication over a network to the client device to cause the client device to remove the first version of the key-value pair from the cache memory; and
subsequent to transmitting the invalidation communication:
transmit the second version of the key-value pair to the client device for causing the client device to store the second version of the key-value pair in the cache memory of the client device; and
update the probabilistic data structure to indicate that there is the positive probability of the client device having the second version of the key-value pair.

13. The server of claim 12, wherein:
the probabilistic data structure includes a plurality of bins, each bin in the plurality of bins being designated for at least one respective key-value pair; and
determining that there is the positive probability that the client device has the first version of the key-value pair comprises:
determining that the client device corresponds to the probabilistic data structure;
determining that a key of the first version of the key-value pair corresponds to a particular bin of the plurality of bins, wherein the particular bin is designated as having one or more key-value pairs that are stored on the client device; and
determining that there is the positive probability that the client device has the first version of the key-value pair based on determining that the client device corresponds to the probabilistic data structure and that the key corresponds to the particular bin.

14. The server of claim 13, wherein the invalidation communication is configured to cause the client device to remove, from the cache memory, all of the key-value pairs corresponding to the particular bin.

15. The server of claim 12, wherein the probabilistic data structure is a bloom filter having a predefined number of bits, and wherein the memory device further comprises instructions that are executable by the processing device for causing the processing device to configure the bloom filter to correspond to a plurality of key-value pairs that includes the first version of the key-value pair.

16. The server of claim 12, wherein the memory device further comprises instructions that are executable by the processing device for causing the processing device to:
store a plurality of probabilistic data structures, wherein each probabilistic data structure in the plurality of probabilistic data structures is designated for a respective client device among a plurality of client devices and indicates a respective probability of the respective client device having one or more key-value pairs; and
determine that the client device corresponds to the probabilistic data structure from among the plurality of probabilistic data structures by accessing a database that relates the plurality of client devices to the plurality of probabilistic data structures.

17. The server of claim 12, wherein the memory device further comprises instructions that are executable by the processing device for causing the processing device to, prior to determining the second version of the key-value pair:
receive a read request from the client device for reading the key-value pair;
transmit the first version of the key-value pair to the client device in response to the read request; and
update the probabilistic data structure to indicate that there is the positive probability of the client device having the first version of the key-value pair.

18. The server of claim 12, wherein the memory device further comprises instructions that are executable by the processing device for causing the processing device to:
after transmitting the invalidation communication, update the probabilistic data structure to indicate that the client device does not have the first version of the key-value pair in the cache memory.

19. The server of claim 12, wherein the probabilistic data structure is a first probabilistic data structure, and wherein the memory device further comprises instructions that are executable by the processing device for causing the processing device to:
receive, from the client device, an electronic communication indicating a state of a second probabilistic data structure stored on the client device, the second probabilistic data structure indicating the probability that the client device has one or more key-value pairs stored in the cache memory; and
based on receiving the electronic communication, update the first probabilistic data structure to match the state of the second probabilistic data structure.

20. The server of claim 19, wherein the electronic communication further indicates a version of the second probabilistic data structure, and wherein the memory device further comprises instructions that are executable by the processing device for causing the processing device to update the first probabilistic data structure based on determining that the version of the second probabilistic data structure matches a version of the first probabilistic data structure.

21. A non-transitory computer-readable medium comprising program code that is executable by a processing device of a server for causing the processing device to:
store a probabilistic data structure indicating a probability that a cache memory of a client device has a first version of a key-value pair, the client device being remote from the server;
determine a second version of the key-value pair that is different from the first version of the key-value pair;
determine a positive probability that the client device has the first version of the key-value pair stored in the cache memory using the probabilistic data structure;
based on determining the second version of the key-value pair and the positive probability that the client device has the first version of the key-value pair stored in the cache memory, transmit an invalidation communication over a network to the client device to cause the client device to remove the first version of the key-value pair from the cache memory; and
subsequent to transmitting the invalidation communication:
transmit the second version of the key-value pair to the client device for causing the client device to store the second version of the key-value pair in the cache memory of the client device; and
update the probabilistic data structure to indicate that there is the positive probability of the client device having the second version of the key-value pair.

22. The non-transitory computer-readable medium of claim 21, wherein:
the probabilistic data structure includes a plurality of bins, each bin in the plurality of bins being designated for at least one respective key-value pair; and
determining that there is the positive probability that the client device has the first version of the key-value pair comprises:
determining that the client device corresponds to the probabilistic data structure;
determining that a key of the first version of the key-value pair corresponds to a particular bin of the plurality of bins, wherein the particular bin is designated as having one or more key-value pairs that are stored on the client device; and
determining that there is the positive probability that the client device has the first version of the key-value pair based on determining that the client device corresponds to the probabilistic data structure and that the key corresponds to the particular bin.

23. The non-transitory computer-readable medium of claim 22, wherein the invalidation communication is configured to cause the client device to remove, from the cache memory, all of the key-value pairs corresponding to the particular bin.

24. The non-transitory computer-readable medium of claim 21, wherein the probabilistic data structure is a bloom filter having a predefined number of bits, and further comprising program code that is executable by the processing device for causing the processing device to configure the bloom filter to correspond to a plurality of key-value pairs that includes the first version of the key-value pair.

25. The non-transitory computer-readable medium of claim 21, further comprising program code that is executable by the processing device for causing the processing device to:
store a plurality of probabilistic data structures, wherein each probabilistic data structure in the plurality of probabilistic data structures is designated for a respective client device among a plurality of client devices and indicates a respective probability of the respective client device having one or more key-value pairs; and
determine that the client device corresponds to the probabilistic data structure from among the plurality of probabilistic data structures by accessing a database that relates the plurality of client devices to the plurality of probabilistic data structures.

26. The non-transitory computer-readable medium of claim 21, further comprising program code that is executable by the processing device for causing the processing device to, prior to determining the second version of the key-value pair:
- receive a read request from the client device for reading the key-value pair;
- transmit the first version of the key-value pair to the client device in response to the read request; and
- update the probabilistic data structure to indicate that there is the positive probability of the client device having the first version of the key-value pair.

27. The non-transitory computer-readable medium of claim 21, further comprising program code that is executable by the processing device for causing the processing device to:
- after transmitting the invalidation communication, update the probabilistic data structure to indicate that the client device does not have the first version of the key-value pair in the cache memory.

28. The non-transitory computer-readable medium of claim 21, wherein the probabilistic data structure is a first probabilistic data structure, and further comprising program code that is executable by the processing device for causing the processing device to:
- receive, from the client device, an electronic communication indicating a state of a second probabilistic data structure stored on the client device, the second probabilistic data structure indicating the probability that the client device has one or more key-value pairs stored in the cache memory; and
- based on receiving the electronic communication, update the first probabilistic data structure to match the state of the second probabilistic data structure.

29. The non-transitory computer-readable medium of claim 28, wherein the electronic communication further indicates a version of the second probabilistic data structure, and further comprising program code that is executable by the processing device for causing the processing device to update the first probabilistic data structure based on determining that the version of the second probabilistic data structure matches a version of the first probabilistic data structure.

* * * * *